(12) United States Patent
    Jackson

(10) Patent No.: US 8,469,039 B2
(45) Date of Patent: Jun. 25, 2013

(54) NAIL GRINDER

(76) Inventor: George D. Jackson, Greensboro, NC (US)

( * ) Notice: Subject to any disclaimer, the term of this patent is extended or adjusted under 35 U.S.C. 154(b) by 474 days.

(21) Appl. No.: 11/927,745

(22) Filed: Oct. 30, 2007

(65) Prior Publication Data

US 2008/0099032 A1  May 1, 2008

(51) Int. Cl.
*A45D 7/00* (2006.01)

(52) U.S. Cl.
USPC .......................................... 132/200

(58) Field of Classification Search
USPC ................. 132/75.6, 75.8, 76.4, 75.3, 73.5, 132/73.6; 433/166; 119/608–610, 620
See application file for complete search history.

(56) References Cited

U.S. PATENT DOCUMENTS

| | | | | |
|---|---|---|---|---|
| 2,544,248 A | | 3/1951 | Ashmead | 132/75.8 |
| 3,913,594 A | * | 10/1975 | Tsukamoto | 132/76.4 |
| 4,440,182 A | * | 4/1984 | Holm | 132/75.6 |
| 4,753,253 A | * | 6/1988 | Hutson | 132/73.6 |
| 5,334,020 A | * | 8/1994 | Eckert | 433/166 |
| 5,666,981 A | * | 9/1997 | Stephens | 132/76.4 |
| 5,918,375 A | | 7/1999 | Rossi, III | 33/485 |
| 6,142,155 A | * | 11/2000 | Rudolph | 132/76.4 |
| 6,827,038 B2 | * | 12/2004 | Dunn et al. | 119/600 |
| D596,357 S | * | 7/2009 | Rosen | D30/158 |
| 2006/0150992 A1 | * | 7/2006 | Nevakshonoff | 132/73.6 |

* cited by examiner

*Primary Examiner* — Robyn Doan

(57) ABSTRACT

A tool for grinding the nail of an animal is shown and described. In one embodiment, the tool includes a head having a distal end and a proximal end. The distal end of the head defines a depression sized for receiving the nail of said animal. The depression also narrows proximally. The tool also includes an abrasive surface inside of the depression.

1 Claim, 4 Drawing Sheets

NAIL GRINDER

BACKGROUND

(1) Field

The present invention relates generally to the grooming of pet nails. More particularly, the present invention relates to tools for grinding and polishing the nails of a pet, such as a dog, after trimming.

(2) Description of the Related Art

FIG. 1a shows a partial view of an animal paw 2, e.g., a dog's paw. Located at the distal end of paw 2 is nail 4, which contains quick or kwick 6. Kwick 6 is where the blood supply to the nail is maintained. Both nail 4 and kwick 6 grow with time. As part of the regular grooming process, or because of various medical conditions, it is often necessary to trim animal nails. During nail trimming, it is important that the kwick not be damaged.

FIG. 1b shows paw 2 and nail 4 after nail 4 has been trimmed along line 10. Because pet nails are typically thick and hard, the edge surrounding cut 10 can be very sharp and dangerous for the pet and for others. As a result, it is often necessary to use a file or a rotary drum sander to grind away, smooth, or debur the sharp edge of the nail. Using a file can be time consuming because of the nail's thickness and because of the animal's desire to move. Using a drum sander can also be time consuming, and requires care and skill to avoid grinding away too much nail and damaging the kwick, which can result in pain, bleeding, and tissue damage.

It is to these problems that the present invention is directed.

SUMMARY

One embodiment of the invention includes a grinding tool for grinding the nail of an animal. In this embodiment, the tool includes a head having a distal end and a proximal end. The distal end of the head defines a depression sized for receiving the nail of the animal. The depression also narrows proximally. The tool also includes an abrasive surface inside of the depression.

In another embodiment, the tool includes a head having a distal end and a proximal end, wherein the distal end defines a depression that has a surface of revolution defined by an arc. An abrasive is bound to the surface of the depression. A shank connects to the proximal end of the head, and is configured to operably connect to a motor to provide motion to the head.

In another embodiment, the present invention includes a method for grooming the nail of an animal, wherein the nail includes a kwick. The method includes cutting the nail substantially adjacent to the kwick. The method also includes obtaining a tool having a head defining a depression, which has a surface of revolution defined by an arc, and an abrasive bound to the surface. The method includes placing the cut nail into the depression and imparting motion, e.g., rotary, to the tool, thereby grinding the cut nail without damaging the kwick.

The above summary was intended to summarize certain embodiments of the present invention. Structure and methods of the present invention will be set forth in more detail in the figures and detailed description below. It will be apparent, however, that the detailed description is not intended to limit the present invention, the scope of which should be properly determined by the appended claims.

DESCRIPTION OF PREFERRED EMBODIMENTS

Figure 1A:
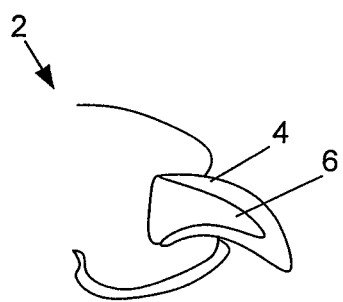
FIGS. 1a and 1b show uncut and cut nails of an animal.
Figure 1B:
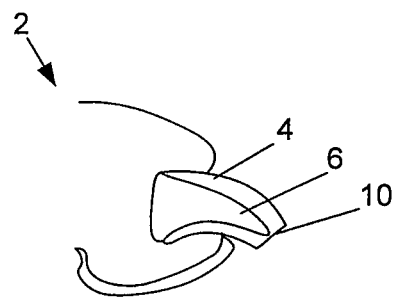
Figure 2A:
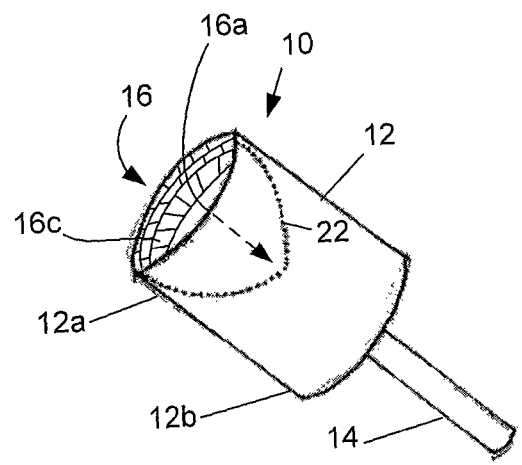
FIGS. 2a and 2b show a perspective and a cut-away view of one embodiment of the present invention.
Figure 2B:
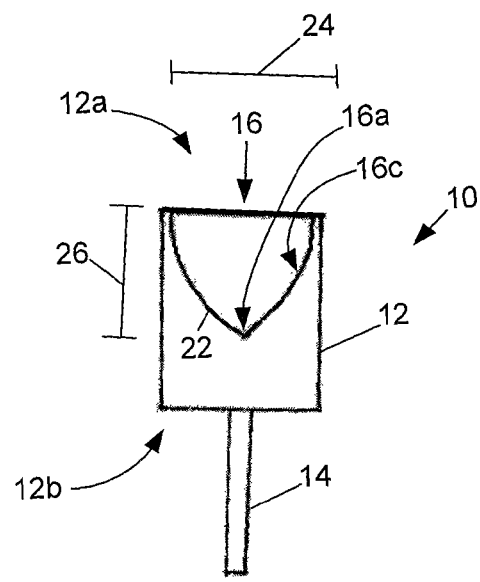

FIG. 2a shows a perspective view of one embodiment of a tool 10 of the present invention for grinding the nail of an animal, e.g., a dog. FIG. 2b shows a cutaway side view of tool 10 from FIG. 2a. Referring to FIGS. 2a and 2b generally, tool 10 includes head 12 and shank 14, both of which are preferably made from a rigid material, e.g., metal. Head 12 includes a distal end 12a and a proximal end 12b. Distal end 12a of head 12 defines depression 16.

Figure 3A:
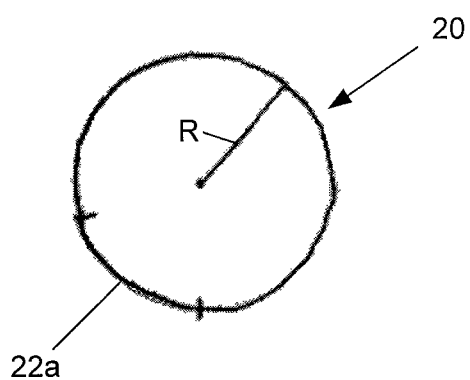
FIGS. 3a and 3b show a circle, an arc segment, and a surface of revolution.
Figure 3B:
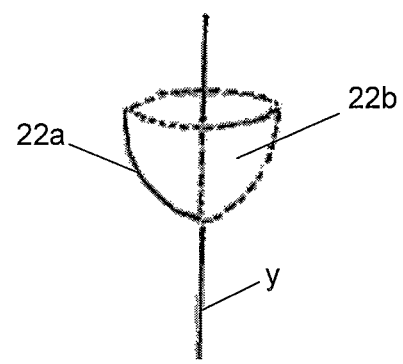

Depression 16 is sized for receiving the nail of an animal and narrows proximally, such that, for example, the deepest point 16a of depression 16 is substantially point-like or a rounded point. In preferred embodiments, the preferred shape of depression 16 is the surface of revolution of an arc or curved shape, even more preferably, the shape of depression 16 is the surface of revolution of an arc of a circle. As illustrated, depression 16 has the surface of revolution of the arc of a circle 22. As used herein, a "surface of revolution" is a shape generated by rotating a two-dimensional line or curve about an axis. As an illustrative example, FIG. 3a shows circle 20 having arc 22a and a radius R. FIG. 3b shows arc 22a substantially adjacent to axis Y at one end, and offset from axis Y at the opposite end. By rotating arc 22a around axis Y, a surface of revolution (illustrated by the dotted lines) is formed. In preferred embodiments, arcs are selected from circles having radiuses of about 4 mm to about 30 mm, depending on the ultimate size of the desired embodiment. For preferred embodiments, e.g., those for grinding the nails of dogs, arcs will be selected from circles having a radius of about 4 mm to about 10 mm. Similarly, in preferred embodiments, the depression has a diameter 24 of about 4 mm to about 15 mm and a depth 26 of about 1 mm to about 6 mm, even more preferably, the depression has a diameter 24 of about 6 mm to about 10 mm, and a depth 26 of about 2 mm to about 5 mm. Others may prefer, for example, for larger animals, e.g., tigers or bears, larger embodiments, all of which are considered to be within the scope of the present invention.

Those of ordinary skill in the art will recognize that the depression's surface of revolution of an arc may be created, for example, by drilling into the head of a tool with an arc-shaped drill bit, thereby defining the surface of revolution with the rotational cutting of the bit. Similarly, a mold defining the surface of revolution of an arc may be created, and from that mold tools having a depression having a surface of revolution of an arc may be molded. Still others may desire other ways, or combinations of ways, to make tools of the present invention, all of which are considered to be within the scope of the present invention.

Tool 10 of the present invention also includes an abrasive surface 16c inside of depression 16. A variety of abrasive surfaces may be used in the present invention, but in preferred embodiments, the abrasive surface will be a surface bonded to depression 16. Preferably, abrasive surface 16c includes metal-bonded industrial diamond, e.g., nickel-plated industrial diamond, yet others may prefer other methods of bonding and other abrasives. For example, others may prefer using a glue or composite to bond other abrasives or industrial diamond. Still, others may prefer other abrasives, e.g., flint, garnet, emery, aluminium oxide, silicon carbide, alumina-zirconia, chromium oxide, ceramic aluminum oxide, or mixtures thereof. As long as the abrasive is hard enough to grind the nail of a dog, the abrasive should perform with some level of success. Alternatively, abrasive surface 16c may be created by casting head 12 from a material having abrasive properties, e.g., a composite including abrasive material, or by texturizing the surface of depression 16, e.g, by cutting filing grooves or notches into the surface of the depression. All such embodiments are considered to be within the scope of the present invention.

In embodiments where particulate abrasives are used, e.g., bonded embodiments, the abrasive has a particle size of about 360 grit to about 40 grit based on CAMI (Coated Abrasive Manufacturers Institute) standards. Even more preferably, abrasive size is about 150 to about 100, and even more preferably still, is about 120. For other embodiments, other abrasive qualities may be selected correspondingly.

Figure 4:
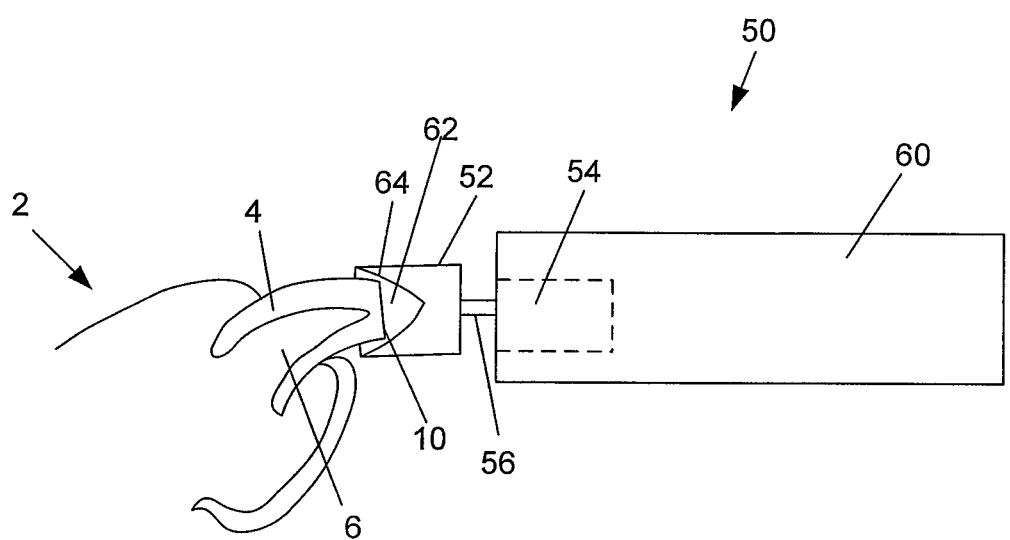
FIG. 4 shows another embodiment of the present invention grinding a nail.

FIG. 4 shows tool 50 according to another embodiment of the present invention being used to grind nail 4 of animal 2. In this embodiment head 52 is operably connected to motor 54 by shaft 56. Preferably motor 54 is a motor that turns shaft 56, which turns head 52. Others may prefer other motors and other types of shaft configurations, or devices for transferring motion to the tool head. For example, others may prefer motors for providing oscillation or sonic vibration, all of which are considered to be within the scope of the present invention. Motor 54 is preferably positioned within handle 60, which facilitates control of head 52.

Head 52 is shown as transparent to help illustrate the present invention. After nail 4 has been trimmed, it contains rough and sharp edges 10. Nail 4 is placed within depression 62 of head 52, and head 52 is rotated by motor 54. The shape of depression 62 allows abrasive surface 64 of depression 62 to quickly and easily grind and smooth nail edge 10 without damaging kwick 6.

Applicant has tried depressions having a variety of shapes. Applicant discovered however that by using a depression having a surface of revolution of an arc of a circle, the nail of an animal can be quickly and easily ground to a satisfactory shape with little risk of damage to the kwick. While applicant believes arcs of various shapes can be used with some degree of success, applicant has found that surfaces of revolution created by arcs of circles produces the most desirable result. Some however, may prefer to use depressions of other shapes, e.g., conical, and applicant considers all such shapes to be within the scope of the present invention.

The present invention also represents an advancement in the art because it is a self-centering tool, meaning that by simply placing the nail within the tool, the motion of the tool head aligns the animal nail to produce the proper shape with little risk of damage to the kwick. With other techniques, active alignment and positioning by the user is required to produce the desired shape.

Applicant has also found that preferred shapes, particularly those leaving a space in between the nail and the bottom of the depression, for example as shown in FIG. 4, are desirable because they reduce the gumming of the abrasive surface with nail material. Applicant believes that the space between the nail and the bottom of the depression serves as a temporary reservoir that stores ground nail material during grinding, but allows it to be released upon moving the tool from nail to nail. As a result, the abrasive surface needs little cleaning during use to perform adequately.

As will be appreciated, the present invention also includes a method of grooming the nail of an animal, e.g., animal 2. The method includes cutting the nail of the animal substantially adjacent to kwick 6, e.g., along line 10 as shown in FIG. 4. The method also includes obtaining a tool according to the present invention, e.g., tool 50. The method also includes placing the nail into the depression of the tool, e.g., into depression 62, and grinding the nail, for example, by using the rotary power provided by motor 54.

Numerous characteristics and advantages have been set forth in the foregoing description, together with details of structure and function. The novel features are pointed out in the appended claims. The disclosure, however, is illustrative only, and changes may be made in detail, especially in matters of shape, size, and arrangement of parts, within the principle of the invention, to the full extent indicated by the broad general meaning of the terms in which the general claims are expressed.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard deviation found in their respective testing measurements. Moreover, all ranges disclosed herein are to be understood to encompass any and all subranges subsumed therein, and every number between the end points. For example, a stated range of "1 to 10" should be considered to include any and all subranges between (and inclusive of) the minimum value of 1 and the maximum value of 10; that is, all subranges beginning with a minimum value of 1 or more, e.g. 1 to 6.1, and ending with a maximum value of 10 or less, e.g., 5.5 to 10, as well as all ranges beginning and ending within the end points, e.g. 2 to 9, 3 to 8, 3 to 9, 4 to 7, and finally to each number 1, 2, 3, 4, 5, 6, 7, 8, 9 and 10 contained within the range. Additionally, any reference referred to as being "incorporated herein" is to be understood as being incorporated in its entirety.

I claim:

1. A method of grooming the nail of an animal, wherein said nail includes a kwick, said method comprising the steps of:
    (a) cutting said nail substantially adjacent to said kwick;
    (b) obtaining a tool having a head with a distal end and a proximal end, wherein said distal end defines a depression that is sized for receiving the nail of said animal, wherein said depression has a surface defined by an arc having an upper end and a lower end, wherein the lower end of said arc is adjacent to the axis of rotation thereby defining a centralized, recessed point in the depression, and wherein the arc concaves outwardly from the axis of rotation and an abrasive surface inside of said depression;
    (c) placing said cut nail into said depression of said tool; and
    (d) imparting motion to said tool, thereby grinding said nail.

* * * * *